(12) United States Patent
Patwardhan et al.

(10) Patent No.: US 10,135,552 B2
(45) Date of Patent: Nov. 20, 2018

(54) ACCESS POINT SIGNAL ESTIMATION

(71) Applicant: Hewlett Packard Enterprise Development LP, Houston, TX (US)

(72) Inventors: Gaurav Patwardhan, Sunnyvale, CA (US); Jiwoong Lee, Sunnyvale, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 202 days.

(21) Appl. No.: 15/201,153

(22) Filed: Jul. 1, 2016

(65) Prior Publication Data

US 2018/0006742 A1 Jan. 4, 2018

(51) Int. Cl.
*H04W 4/00* (2018.01)
*H04B 17/309* (2015.01)
*H04B 17/318* (2015.01)
*H04W 24/08* (2009.01)
*H04W 16/00* (2009.01)

(52) U.S. Cl.
CPC ......... *H04B 17/309* (2015.01); *H04B 17/318* (2015.01); *H04W 24/08* (2013.01); *H04W 16/00* (2013.01)

(58) Field of Classification Search
CPC .... H04W 16/18; H04W 24/08; H04B 17/309; H04B 17/318
See application file for complete search history.

(56) References Cited

U.S. PATENT DOCUMENTS

| 7,385,945 | B1 | 6/2008 | Olson et al. | |
|---|---|---|---|---|
| 2003/0087645 | A1* | 5/2003 | Kim | H04W 28/16 455/453 |
| 2005/0152312 | A1* | 7/2005 | Marinier | H04W 16/18 370/332 |
| 2006/0073827 | A1* | 4/2006 | Vaisanen | H04W 36/0055 455/436 |
| 2011/0136498 | A1* | 6/2011 | Ben-Eli | H04W 72/02 455/452.2 |
| 2013/0279349 | A1 | 10/2013 | Pandey et al. | |
| 2014/0314003 | A1 | 10/2014 | Zhou et al. | |
| 2017/0070976 | A1* | 3/2017 | Shirakawa | H04W 48/20 |

FOREIGN PATENT DOCUMENTS

| WO | WO-2005069519 A1 | 7/2005 |
|---|---|---|
| WO | WO-2010015286 A1 | 2/2010 |

\* cited by examiner

*Primary Examiner* — Kevin C. Harper
(74) *Attorney, Agent, or Firm* — Hewlett Packard Enterprise Patent Department

(57) ABSTRACT

Examples relate to access point signal estimation. In one example, a computing device may: receive a first pathloss value in a first frequency, the first pathloss value indicating a difference in transmit power of a particular access point and a received signal strength observed by a first access point; receive a second pathloss value in the first frequency, the second pathloss value indicating a difference in transmit power of the particular access point and a received signal strength observed by a second access point; receive a third pathloss value in a second frequency, the third pathloss value indicating a difference in transmit power of the particular access point and a received signal strength observed by the second access point in the second frequency; and generate, using the first, second, and third pathloss values, an estimated pathloss between the first access point and the particular access point in the second frequency.

19 Claims, 4 Drawing Sheets

ACCESS POINT SIGNAL ESTIMATION

BACKGROUND

Wireless network communications devices, such as personal computers, mobile phones, Wi-Fi access points, and cellular network access points, transmit data across wireless networks. To provide wireless access to a large area, multiple access points are often spread out with the intent to provide network access to a target area, such as an office building, a park, or a retail store. Access point placement may have a significant impact on the quality of wireless communications and may also affect user behavior and satisfaction.

BRIEF DESCRIPTION OF THE DRAWINGS

The following detailed description references the drawings, wherein.

DETAILED DESCRIPTION

Figure 1:
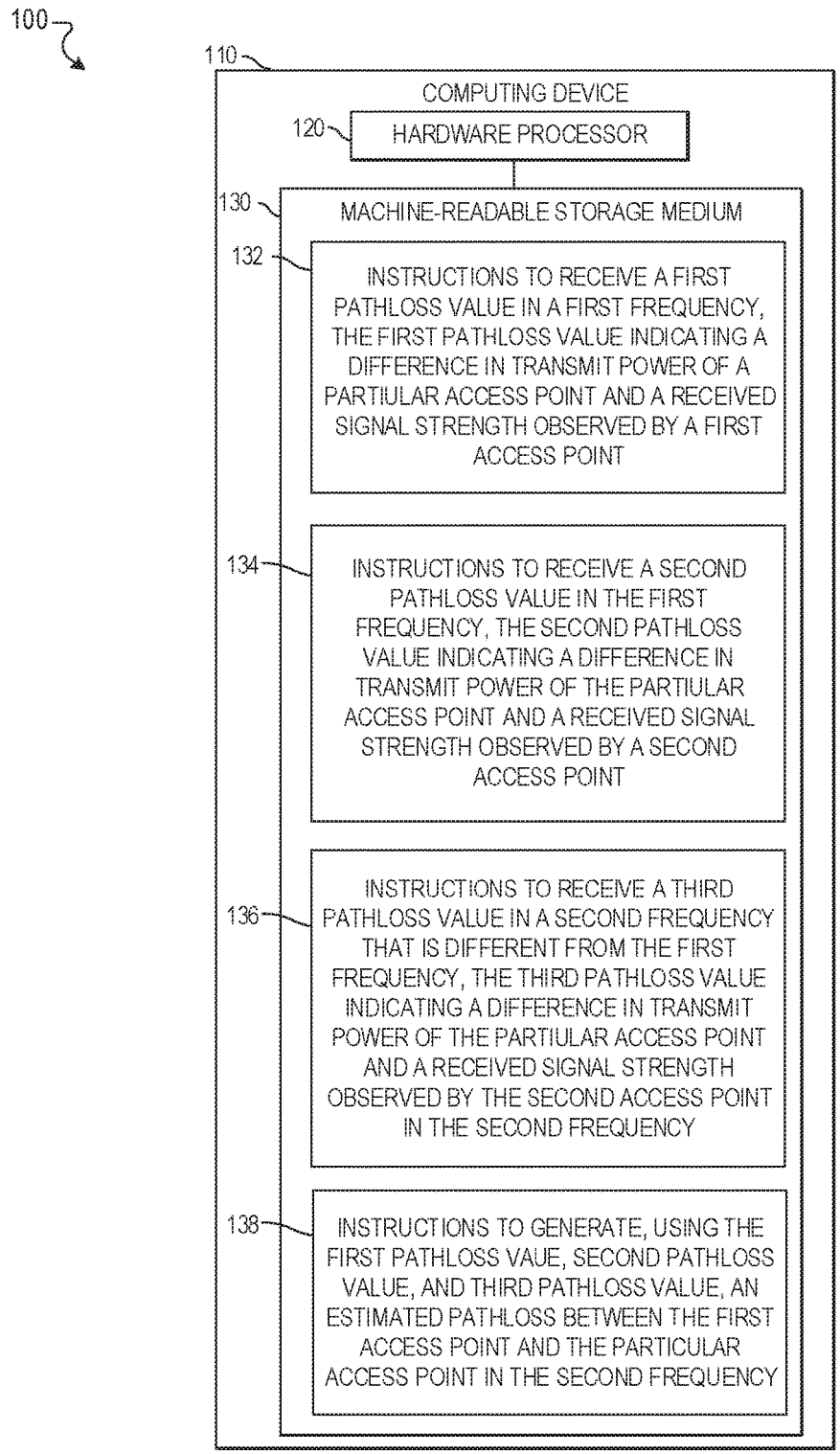
FIG. 1 is a block diagram of an example computing device for access point signal estimation.

Wireless access points generally use antennas to emit wireless signals that can be received and used by other wireless devices. Wireless signal strength may depend on a variety of factors, such as the power output of a wireless access point, wireless congestion from other wireless communications, and interference from electrical sources and physical objects. To increase wireless coverage for an area, multiple wireless access points are often deployed near each other in order to increase wireless availability and signal strength for devices that make use of the network. In addition, wireless access points often use multiple radios in different frequencies and communicate using different channels within those frequencies, e.g., in a manner designed to reduce interference between access points.

Various techniques may be used when deploying multiple access points in a particular location in a manner designed to improve the users' wireless experience. For example, an administrator may physically space access points throughout a building in a particular pattern. However, physical obstructions and electronic devices, among other things, may cause interference that makes physical placement of access points difficult to do manually while maintaining a desired quality of wireless coverage. Wireless signal strength measurements between access points may be a useful feature for placing wireless access points, e.g., a received signal strength measurement (RSSI), measured in dBm, or a pathloss measurement, measured in dB, may provide an indication of the signal strength between wireless access points. RSSI and pathloss may be used, for example, to determine whether access points are too close or too far from one another, and various techniques may be used that rely on the signal strength measurements to manage the access points. For example, the signal strength measurements may be used to manually adjust physical placement of access points or adjust output/transmit power of the wireless radios.

Wireless access points are capable of automatically discovering one another using techniques such as off-channel scanning for beacons of other access points and sending over-the-air frames for other access points to discover. For example, a 2.4 GHz radio broadcasting on channel 11 may send out a beacon packet, which may be discovered by a second access point that is listening for beacon packets at the same frequency and on the same channel. However, with this type of discovery, access points often change their home wireless channel to scan for other access points communicating in the off-channel. Depending on the frequency with which access points change channels, which may be performed every other frame in a round robin style, one access point may miss a beacon packet if it is scanning a particular channel while another access point is also performing off-channel scanning. For example, the 2.4 GHz radio broadcasting its beacon packet on channel 11 may frequently scan other 2.4 GHz channels in an attempt to identify other 2.4 GHz radios. However, a second 2.4 GHz radio broadcasting its beacon packet on channel 1 may be doing the same thing, and the access points may miss the beacon packets if they are both off-channel, failing to discover one another.

When using multiple radios, e.g., a 2.4 GHz radio and a 5 GHz radio, different channels may be used on each radio. This may cause access point discovery techniques, like the off-channel scanning described above, take longer, especially at a frequency where many channels are available for wireless communications. To facilitate the access point discovery process and obtain signal strength measurements that can be used, for example, to facilitate access point placement and power output, access points using multiple radios may be configured to estimate signal strength.

By way of example, three access points may be within range of one another and communicating on both 2.4 GHz and 5 GHz radios. A first access point may have determined a pathloss value—the reduction in power of wireless signals as they propagate through space—between the first access point and the second access point in the 2.4 GHz spectrum using normal off-channel discovery. E.g., the first access point may have scanned for and found the second access point's beacon packet, determined the RSSI for the beacon packet, and used the power output of the second access point to determine the pathloss. An example pathloss value is 100 dB. However, the first access point may not yet have discovered the 5 GHz radio of the second access point.

A third access point which has discovered and determined pathloss values for both the 2.4 GHz radio and the 5 GHz radio of the second access point, may communicate its pathloss values to the first access point. For example, the third access point may provide data to the first access point indicating that its pathloss to the second access point is 80 dB in the 2.4 GHz frequency and 100 in the 5 GHz frequency. Using the three pathloss values, the first access point may estimate its pathloss to the second access point in the 5 GHz frequency. For example, the ratio of the 2.4 GHz pathloss to the 5 GHz pathloss observed by the third access point is 80:100, or 4:5. When access points are deployed in an environment similar to one another, the first access point may assume the same or a similar ratio would likely apply to its own pathloss values. Using the example ratio of 4:5, the first access point may estimate that its pathloss to the 5 GHz radio of the second access point is 125 dB, e.g., 4:5=100:125. As noted above, the estimated pathloss values may be used to facilitate access point placement and power output, e.g., in a manner designed to improve user experience. Further details and examples of estimating wireless signal strength are described in further detail below.

Referring now to the drawings, FIG. 1 is a block diagram 100 of an example computing device 110 for access point signal estimation. Computing device 110 may be, for example, a server computer, a personal computer, a wireless router, a cellular device, such as a cell phone, or any other similar electronic device capable of processing data. In the example implementation of FIG. 1, the computing device 110 includes a hardware processor, 120, and machine-readable storage medium, 130.

Hardware processor 120 may be one or more central processing units (CPUs), semiconductor-based microprocessors, and/or other hardware devices suitable for retrieval and execution of instructions stored in machine-readable storage medium, 130. Hardware processor 120 may fetch, decode, and execute instructions, such as 132-138, to control processes for access point signal estimation. As an alternative or in addition to retrieving and executing instructions, hardware processor 120 may include one or more electronic circuits that include electronic components for performing the functionality of one or more instructions, such as a field programmable gate array (FPGA) or application specific integrated circuit (ASIC).

A machine-readable storage medium, such as 130, may be any electronic, magnetic, optical, or other physical storage device that contains or stores executable instructions. Thus, machine-readable storage medium 130 may be, for example, Random Access Memory (RAM), non-volatile RAM (NVRAM), an Electrically Erasable Programmable Read-Only Memory (EEPROM), a storage device, an optical disc, and the like. In some implementations, storage medium 130 may be a non-transitory storage medium, where the term "non-transitory" does not encompass transitory propagating signals. As described in detail below, machine-readable storage medium 130 may be encoded with executable instructions: 132-138, for access point signal estimation.

As shown in FIG. 1, the hardware processor 120 executes instructions 132 to receive a first pathloss value in a first frequency, the first pathloss value indicating a difference in transmit power of a particular access point and a received signal strength observed by a first access point. For example, the computing device 110 may be a server computer that is responsible for managing a network of wireless access points. The first pathloss value, e.g., 100 dB in the 5 GHz frequency, may be provided to the server computer by a first wireless access point managed by the server computer. In some implementations, the particular access point may be included in the computing device 110.

The hardware processor 120 executes instructions 134 to receive a second pathloss value in the first frequency, the second pathloss value indicating a difference in transmit power of the particular access point and a received signal strength observed by a second access point. For example, the second pathloss value, e.g., 120 dB in the 5 GHz frequency, may be provided to the example server computer by a second wireless access point managed by the server computer.

The hardware processor 120 executes instructions 136 to receive a third pathloss value in a second frequency that is different from the first frequency, the third pathloss value indicating a difference in transmit power of the particular access point and a received signal strength observed by the second access point in the second frequency. For example, the second frequency may be the 2.4 GHz frequency. The third pathloss value, e.g., 90 dB in the 2.4 GHz frequency, may be provided to the example server computer by the second wireless access point managed by the server computer.

In some implementations, the first, second, and/or third pathloss values may be average pathloss values, e.g., determined by taking an average observed pathloss over a certain period of time. This feature may be useful, for example, in situations where signal strength varies over time. The periods of time used may vary, e.g., an average over seconds, minutes, hours, or days.

The hardware processor 120 executes instructions 138 to generate, using the first pathloss value, second pathloss value, and third pathloss value, an estimated pathloss between the first access point and the particular access point in the second frequency. In some implementations, the estimated pathloss is generated in such a way that a ratio of the first pathloss (100 dB) to the estimated pathloss is proportional to a ratio of the second pathloss (120 dB) to the third pathloss (90 dB). Using the example pathloss values above, and an exact ratio proportion, the estimated pathloss would be 75 dB in the 2.4 GHz frequency, e.g., 100:75=120:90. One example formula for performing the estimation is to divide the third pathloss (90 dB) by the second pathloss (120 dB), and multiply the result by the first pathloss (100 dB). This example formula also results in an estimated pathloss of 75 dB, e.g., (90/120)*100=75. The actual formula used to generate the estimated pathloss may vary and, in some implementation, may introduce use an uncertainty value, e.g., to provide a margin for error in the estimate.

In some implementations, additional pathloss values from other access points may be used to estimate pathloss between the first access point and the particular access point. For example, an additional access point may provide fourth and fifth pathloss values to the computing device 110, e.g., 110 dB and 80 dB in the 5 GHz and 2 GHz frequencies, respectively. The fourth and fifth pathloss values may be used when generating the estimated pathloss and/or to adjust the estimated pathloss. For example, a second estimated pathloss may be calculated using the pathloss values provided by the additional access point. Using one of the example formulas above results in an estimated pathloss of 73 dB, e.g., (80/110)*100=~72.73. In some implementations multiple estimated pathloss values may be used, e.g., by averaging, to determine the pathloss estimate. By averaging the two example pathloss values of 75 dB and 73 dB, an estimated pathloss of 74 dB may be determined for 2.4 GHz signal between the first access point and the particular access point.

While the examples above use the 2.4 GHz and 5 GHz frequencies, any other frequencies may be used. In addition, pathloss may be estimated for wireless access points that may use more than two radios in a similar fashion. While pathloss values are used for wireless signal strength estimation, other values, such as RSSI, may also be used. Pathloss values may be determined by each access point individually, by a computing device that manages the access points, or a combination thereof.

Figure 2:
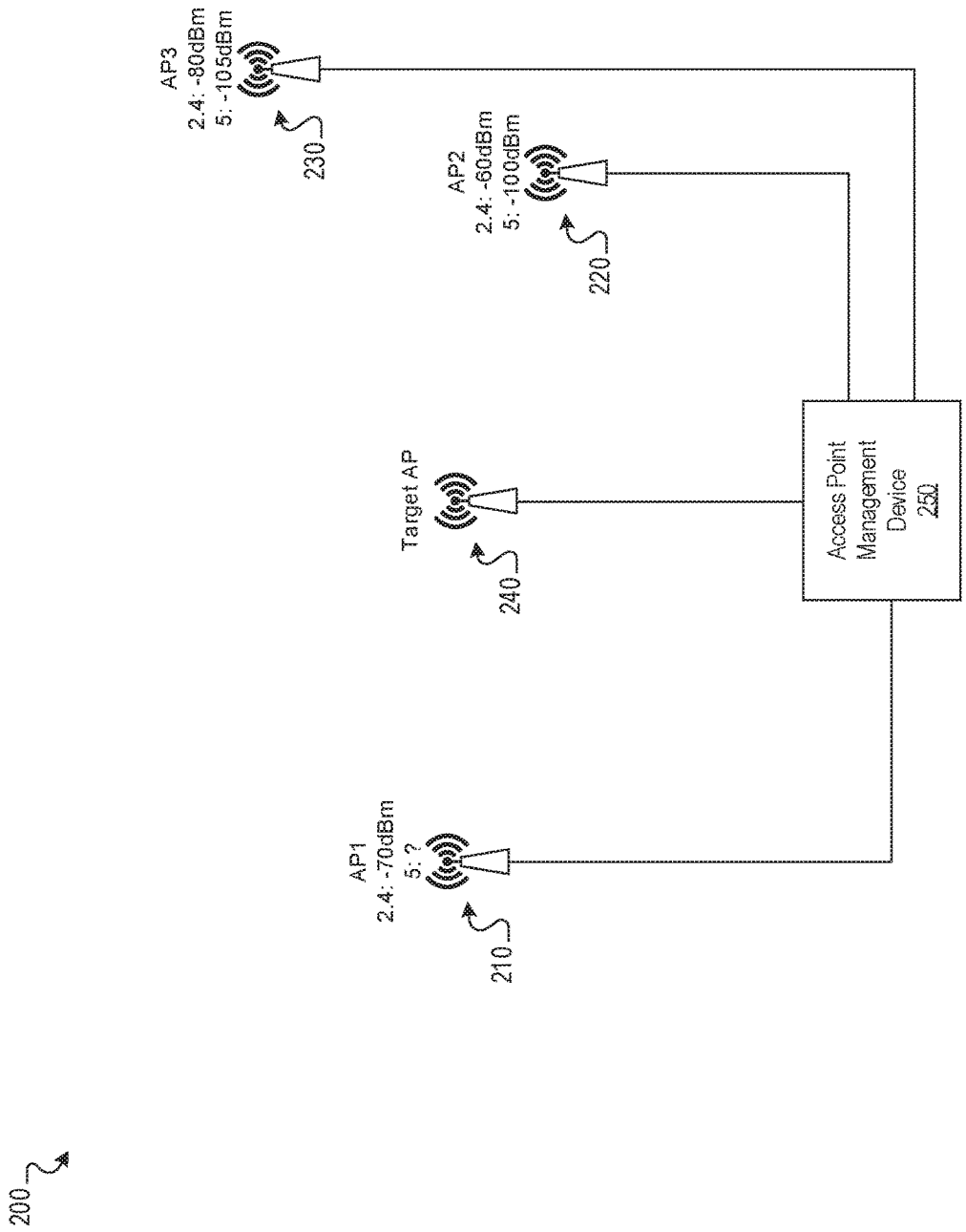
FIG. 2 is an example diagram depicting access point signal estimation facilitated by an access point management device.

FIG. 2 is an example diagram 200 depicting access point signal estimation facilitated by an access point management device 250. The access point management device 250 may be a computing device, such as the computing device 110 of FIG. 1. The example diagram also includes four access points: AP1 210, AP2 220, AP3 230, and Target AP 240. In the example diagram 200, a signal strength measurement—RSSI in this example—is estimated between AP1 210 and Target AP 240 in the 5 GHz frequency using RSSI measurements from AP2 220 and/or AP3 230.

For example, the access point management device 250 may be provided with the RSSI measurements recorded by each of the access points. Using an example formula provided above and the RSSI values of AP2 220, the estimated RSSI between AP1 210 and Target AP 240 in the 5 GHz frequency is −117 dBm, e.g., (−100/−60)*−70=~−116.67. Using the same example formula and the RSSI values of AP3 230, the estimated RSSI between AP1 210 and Target AP 240 in the 5 GHz frequency would be −92 dBm, e.g., (−105/−80)*−70=−91.875. In an implementation where an average of estimated RSSI values is used to estimate RSSI, the average estimated RSSI using the example values above is approximately −105 dB. As noted above, other formulas may be used to determine estimated signal strength, and when using multiple access points, other methods for adjusting an estimate or generating an estimate may be used, e.g., using the average, the median, or some other value.

In some implementations, access points used to estimate signal strength may be weighted, or preferred, when used to determine an estimated signal strength measurement. For example, a network administrator may know that AP2 220 is in the same room of a building that AP1 210 is in, and that AP3 230 is in a different room on a different floor of a different building. Using this knowledge, an administrator may choose to prefer the estimate provided by AP2 220 rather than AP3 230. As another example, the administrator may use both estimates, but weigh the estimate associated with AP2 220 more heavily than the estimate associated with AP3 230.

Figure 3:
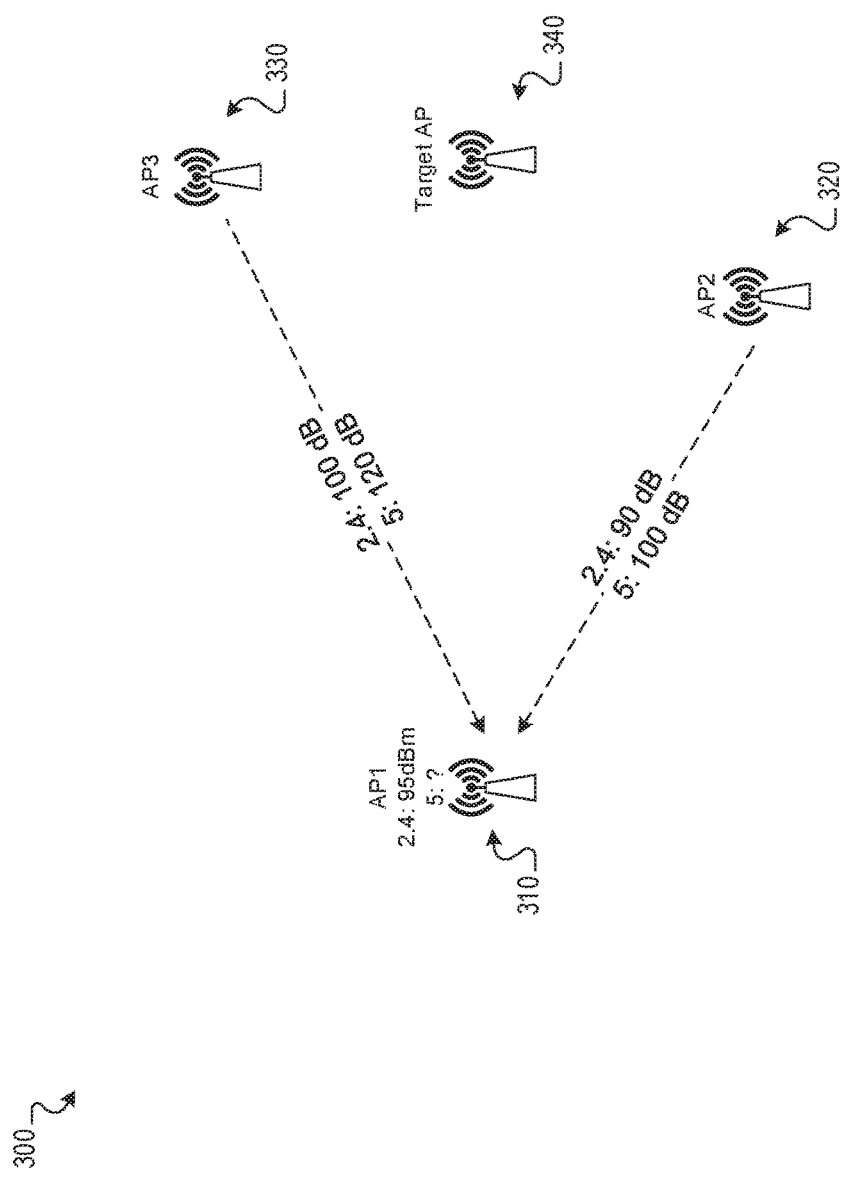
FIG. 3 is an example data flow depicting access point signal estimation at an access point.

FIG. 3 is an example data flow 300 depicting access point signal estimation at an access point, e.g., AP1 310. In this example data flow 300, an access point performs the signal estimation, e.g., rather than the estimation being performed by a separate computing device. In the example data flow 300, access points AP2 320 and AP3 330 provide pathloss values to AP1 310, The provided pathloss values are the values in the 2.4 GHz and 5 GHz frequencies, observed between each respective access point and Target AP 340. In some implementations, some or all of the pathloss values associated with AP2 320 and AP3 330 may be provided by a computing device that is separate from the depicted access points, e.g., by an access point management device.

In the example data flow 300, AP1 310 has observed its own pathloss to Target AP 340 in the 2.4 GHz frequency but has not yet determined pathloss to Target AP 340 in the 5 GHz frequency. This pathloss value may be determined using transmission data, e.g., a beacon packet that was sent by Target AP 340 and received by AP1 310. For example, AP1 310 may have identified a beacon packet from Target AP 340 while performing off-channel scanning in the 2.4 GHz frequency. An RSSI of −75 dBm may have been determined by AP1 310 upon receipt of the beacon packet, and the beacon packet may have included data that indicated the transmit power of Target AP 340, e.g., 20 dBm. Using the RSSI and transmit power, AP1 310 may determine a pathloss value of 95 dB between AP1 310 and Target AP 340 in the 2.4 GHz frequency. In some implementations, the transmit power of Target AP 340 may be provided to AP1 310 by a separate device, such as an access point management device.

Using the example pathloss values provided by AP2 320 and/or AP3 330 in the example data flow 300, AP1 310 may determine an estimated pathloss between AP1 310 and Target AP 340 in the 5 GHz frequency. Using the values of AP2 320, for example, AP1 310 may estimate the pathloss between AP1 310 and Target AP 340 to be 114 dB, e.g., (120/100)*95=114 dB. Using the values of AP3 330, AP1 310 may estimate the pathloss between AP1 310 and Target AP 340 to be 106 dB, e.g., (100/90)*95=~105.56. In situations where estimated pathloss values calculated using multiple access points are averaged, the estimated pathloss between AP1 310 and Target AP 340 may be 110 dB.

Figure 4:
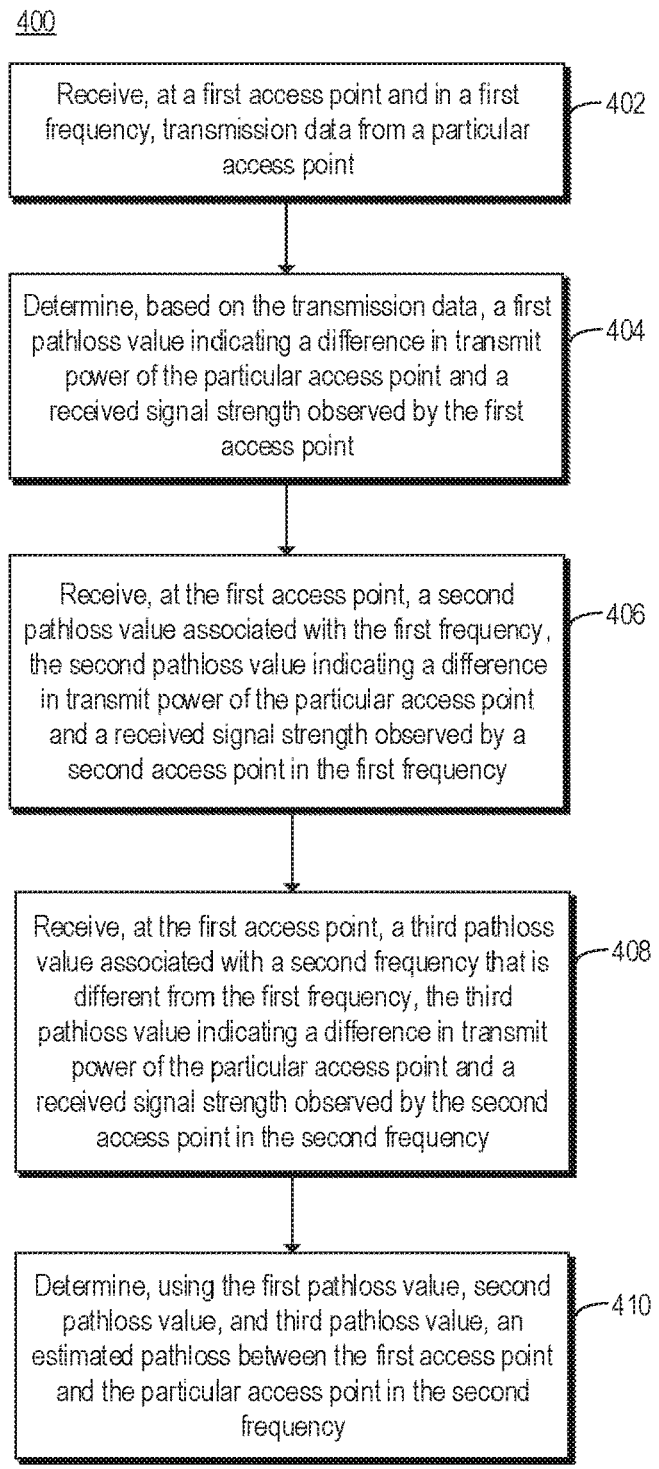
FIG. 4 is a flowchart of an example method for access point signal estimation.

FIG. 4 is a flowchart of an example method 400 for access point signal estimation. The method 400 may be performed by a computing device, such as a computing device described in FIG. 1, e.g., in the form of an access point. Other computing devices may also be used to execute method 400. Method 400 may be implemented in the form of executable instructions stored on a machine-readable storage medium, such as the storage medium 130, and/or in the form of electronic circuitry.

At a first access point and in a first frequency, transmission data from a particular access point is received (402). Transmission data may be, for example, a beacon packet sent by the particular access point using a 2.4 GHz radio. The transmission data may information regarding the particular access point, including—in some implementations—a transmit power. The transmission data, e.g., the transmit power, may in some implementations be provided by the particular access point indirectly, e.g., from an access point management device in communication with the first access point and the particular access point. When receiving a beacon packet from the particular access point, the first access point may also determine a signal strength measurement, e.g., an RSSI, for the beacon packet.

Based on the transmission data, a first pathloss value is determined that indicates a difference in transmit power of the particular access point and a received signal strength observed by the first access point (404). For example, in a situation where the transmit power of the particular access point is 15 dBm, and the RSSI observed by the first access point using the beacon packet was −65 dBm, the first pathloss in the 2.4 GHz frequency may be the difference between the two, e.g., 80 dB.

At the first access point, a second pathloss value is received that is associated with the first frequency, the second pathloss value indicating a difference in transmit power of the particular access point and a received signal strength observed by a second access point in the first frequency (406), For example, a second access point may, directly or indirectly using an access point management device, send a second pathloss value of 90 dB in the 2.4 GHz frequency.

At the first access point, a third pathloss value is received that is associated with a second frequency that is different from the first frequency, the third pathloss value indicating a difference in transmit power of the particular access point and a received signal strength observed by the second access point in the second frequency (408). For example, the second access point may, directly or indirectly using an access point management device, send a third pathloss value of 130 dB in the 5 GHz frequency.

As noted above, in some implementations, average pathloss values may be used. For example, the average pathloss over time may be more likely to provide a more consistent and/or predictable pathloss measurement.

Using the first pathloss value, second pathloss value, and third pathloss value, an estimated pathloss is determined between the first access point and the particular access point in the second frequency (410). For example, a pathloss value may be estimated by determining a ratio of the first pathloss to the estimated pathloss as being equal to a ratio of the second pathloss to the third pathloss, resulting in an estimated pathloss of 116 dB, e.g., 80:116=90:130 when rounded.

In some implementations, additional pathloss values from additional access points may be used to determine an estimated pathloss. For example, at the first access point, a fourth pathloss value may be received that is associated with the first frequency, the fourth pathloss value indicating a difference in transmit power of the particular access point and a received signal strength observed by a third access point in the first frequency, and a fifth pathloss value may be received that is associated with the second frequency, the fifth pathloss value indicating a difference in transmit power of the particular access point and a received signal strength observed by the third access point in the second frequency. The estimated pathloss may be adjusted using the fourth and fifth pathloss values. For example, a second estimated pathloss may be determined and averaged with the first determined pathloss estimate. As noted above, signal estimation may be performed using a number of additional signal strength measurements from a number of other access points.

The foregoing disclosure describes a number of example implementations for access point signal estimation. As detailed above, examples provide a mechanism for determining an estimated signal strength for an access point using signal strength measurements of at least one other access point.

We claim:

1. A non-transitory machine-readable storage medium encoded with instructions executable by a hardware processor of a computing device for access point signal estimation, the non-transitory machine-readable storage medium comprising instructions to cause the hardware processor to:
   receive a first pathloss value in a first frequency, the first pathloss value indicating a difference in transmit power of a particular access point and a received signal strength measured by a first access point;
   receive a second pathloss value in the first frequency, the second pathloss value indicating a difference in transmit power of the particular access point and a received signal strength measured by a second access point;
   receive a third pathloss value in a second frequency that is different from the first frequency, the third pathloss value indicating a difference in transmit power of the particular access point and a received signal strength measured by the second access point in the second frequency;
   generate, based on the first pathloss value, the second pathloss value, and the third pathloss value, an estimated pathloss value between the first access point and the particular access point in the second frequency; and
   facilitate physical placement of the particular access point, the first access point, and the second access point, based on the first pathloss value, the second pathloss value, the third pathloss value, and the estimated pathloss value.

2. The non-transitory machine-readable storage medium of claim 1, wherein a ratio of the first pathloss value to the estimated pathloss value is proportional to a ratio of the second pathloss value to the third pathloss value.

3. The non-transitory machine-readable storage medium of claim 1, wherein:
   the first pathloss value is determined using an average pathloss over a first period of time;
   the second pathloss value is determined using an average pathloss over a second period of time; and
   the third pathloss value is determined using an average pathloss over a third period of time.

4. The non-transitory machine-readable storage medium of claim 1, wherein the instructions further cause the hardware processor to:
   receive, for the particular access point, a fourth pathloss value in the first frequency, the fourth pathloss value indicating a difference in transmit power of the particular access point and a received signal strength measured by a third access point; and
   receive, for the particular access point, a fifth pathloss value in the second frequency, the fifth pathloss value indicating a difference in transmit power of the particular access point and a received signal strength measured by the third access point, and wherein the estimated pathloss value is adjusted using the fourth pathloss value and fifth pathloss value.

5. The non-transitory machine-readable storage medium of claim 4, wherein the estimated pathloss value is adjusted by:
   generating a second estimated pathloss value between the first access point and the particular access point in the second frequency using the first pathloss value, the fourth pathloss value, and the fifth pathloss value; and
   averaging the estimated pathloss value and the second estimated pathloss value.

6. The non-transitory machine-readable storage medium of claim 4, wherein:
   the computing device is separate from the particular access point, the first access point, the second access point, and the third access point, and
   the computing device is in communication with the particular access point, the first access point, the second access point, and the third access point.

7. The non-transitory machine-readable storage medium of claim 1, wherein the particular access point is included in the computing device.

8. A computing device for access point signal estimation, the computing device comprising:
   a hardware processor; and
   a data storage device storing instructions that, when executed by the hardware processor, cause the hardware processor to:
   receive a first received signal strength indicator (RSSI) from a first access point, the first RSSI being measured at a first frequency;
   receive a second RSSI from a second access point, the second RSSI being measured at the first frequency;
   receive a third RSSI from the second access point, the third RSSI being measured at a second frequency that is different from the first frequency;
   generate, using the first RSSI, second RSSI, and third RSSI, an estimated RSSI in the second frequency for the first access point; and
   facilitate physical placement of the first access point and the second access point, based on the first RSSI, the second RSSI, the third RSSI, and the estimated RSSI.

9. The computing device of claim 8, wherein a ratio of the first RSSI to the estimated RSSI is proportional to a ratio of the second RSSI to the third RSSI.

10. The computing device of claim 8, wherein:
    the first RSSI is determined using an average RSSI over a first period of time;
    the second RSSI is determined using an average RSSI over a second period of time; and
    the third RSSI is determined using an average RSSI over a third period of time.

11. The computing device of claim 8, wherein the instructions further cause the hardware processor to:
    receive, for a particular access point, a fourth RSSI in the first frequency, the fourth RSSI indicating a difference in transmit power of the particular access point and a received signal strength measured by a third access point; and receive, for the particular access point, a fifth RSSI in the second frequency, the fifth RSSI indicating a difference in transmit power of the particular access point and a received signal strength measured by the third access point, and wherein the estimated RSSI is adjusted using the fourth RSSI and the fifth RSSI.

12. The computing device of claim 11, wherein the estimated RSSI is adjusted by:

generating a second estimated RSSI in the second frequency for the first access point using the first RSSI, the fourth RSSI, and the fifth RSSI; and averaging the estimated RSSI and the second estimated RSSI.

13. The computing device of claim 11, wherein:

the computing device is separate from the particular access point, the first access point, the second access point, and the third access point, and the computing device is in communication with the particular access point, the first access point, the second access point, and the third access point.

14. A method for access point signal estimation, implemented by a hardware processor, the method comprising:

receiving, at a first access point and in a first frequency, transmission data from a particular access point;

determining, based on the transmission data, a first pathloss value indicating a difference in transmit power of the particular access point and a received signal strength measured by the first access point;

receiving, at the first access point, a second pathloss value associated with the first frequency, the second pathloss value indicating a difference in transmit power of the particular access point and a received signal strength measured by a second access point in the first frequency;

receiving, at the first access point, a third pathloss value associated with a second frequency that is different from the first frequency, the third pathloss value indicating a difference in transmit power of the particular access point and a received signal strength measured by the second access point in the second frequency;

determining, based on the first pathloss value, the second pathloss value, and the third pathloss value, an estimated pathloss value between the first access point and the particular access point in the second frequency; and facilitating physical placement of the particular access point, the first access point, and the second access point, based on the first pathloss value, the second pathloss value, the third pathloss value, and the estimated pathloss value.

15. The method of claim 14, wherein a ratio of the first pathloss value to the estimated pathloss value is proportional to a ratio of the second pathloss value to the third pathloss value.

16. The method of claim 14, wherein:

the first pathloss value is determined using an average pathloss over a first period of time.

17. The method of claim 14, further comprising:

receiving, at the first access point, a fourth pathloss value associated with the first frequency, the fourth pathloss value indicating a difference in transmit power of the particular access point and a received signal strength measured by a third access point in the first frequency; and receiving, at the first access point, a fifth pathloss value associated with the second frequency, the fifth pathloss value indicating a difference in transmit power of the particular access point and a received signal strength measured by the third access point in the second frequency, and wherein the estimated pathloss value is adjusted using the fourth pathloss value and fifth pathloss value.

18. The method of claim 17, wherein the estimated pathloss value is adjusted by:

generating a second estimated pathloss value between the first access point and the particular access point in the second frequency using the first pathloss value, the fourth pathloss value, and the fifth pathloss value; and averaging the estimated pathloss value and the second estimated pathloss value.

19. The method of claim 14, wherein:

the second pathloss value and third pathloss value are provided by a computing device that is separate from the particular access point, the first access point, and the second access point.

* * * * *